US012546967B2

(12) United States Patent
Eriksen

(10) Patent No.: US 12,546,967 B2
(45) Date of Patent: Feb. 10, 2026

(54) FLEXIBLE CABLE SUPPORT

(71) Applicant: PPC BROADBAND, INC., East Syracuse, NY (US)

(72) Inventor: Kim Eriksen, Tappernøje (DK)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 17/825,299

(22) Filed: May 26, 2022

(65) Prior Publication Data

US 2022/0381371 A1 Dec. 1, 2022

Related U.S. Application Data

(60) Provisional application No. 63/193,274, filed on May 26, 2021.

(51) Int. Cl.
*G02B 6/44* (2006.01)
*F16L 3/02* (2006.01)
*F16L 3/26* (2006.01)
*G02B 6/46* (2006.01)

(52) U.S. Cl.
CPC ............. *G02B 6/4478* (2013.01); *F16L 3/02* (2013.01); *F16L 3/26* (2013.01); *G02B 6/475* (2023.05)

(58) Field of Classification Search
CPC . F16L 3/26; F16L 3/02; H02G 3/0437; H02G 3/045; H02G 3/0475; H02G 3/0462; H02G 3/0487; H02G 11/00; H02G 3/0468; H02G 3/0481
USPC .................................................. 248/53, 160
See application file for complete search history.

(56) References Cited

U.S. PATENT DOCUMENTS

| | | | |
|---|---|---|---|
| 5,461,690 A | 10/1995 | Lampert | |
| 5,473,723 A | 12/1995 | Stockman et al. | |
| 5,507,751 A * | 4/1996 | Goode | A61B 17/32075 606/108 |
| 6,749,560 B1 * | 6/2004 | Konstorum | A61B 1/00071 604/525 |
| 7,418,812 B2 | 9/2008 | Ikeda et al. | |
| 7,515,806 B2 * | 4/2009 | Zellak | G02B 6/4461 385/136 |

(Continued)

FOREIGN PATENT DOCUMENTS

DE 10219532 A1 11/2003
EP 1033289 A2 9/2000
(Continued)

OTHER PUBLICATIONS

International Search Report and Written Opinion dated Sep. 26, 2022 in corresponding International Application No. PCT/US2022/031071, 14 pages.

(Continued)

*Primary Examiner* — Christopher Garft
(74) *Attorney, Agent, or Firm* — MH2 TECHNOLOGY LAW GROUP LLP

(57) ABSTRACT

A flexible cable support includes a first elongated member, a second elongated member and a base. The first elongated member and the second elongated member extend along a longitudinal axis. The base may connect the first elongated member and second elongated member. The first elongated member, the base, and the second elongated member define a longitudinal recess which is configured to receive a cable.

24 Claims, 7 Drawing Sheets

(56) References Cited

U.S. PATENT DOCUMENTS

| | | | |
|---|---|---|---|
| 7,676,132 B1 | 3/2010 | Mandry et al. | |
| 7,845,155 B2 | 12/2010 | Jaeker | |
| 8,821,477 B2* | 9/2014 | Northrop | A61M 25/0054 |
| | | | 604/524 |
| 8,957,310 B2 | 2/2015 | Kaihotsu et al. | |
| 10,080,576 B2* | 9/2018 | Romo | A61B 17/29 |
| 11,189,995 B2 | 11/2021 | Hermey et al. | |
| 2003/0042040 A1 | 3/2003 | Komiya et al. | |
| 2006/0201840 A1* | 9/2006 | Utaki | F16G 13/16 |
| | | | 206/389 |
| 2008/0120958 A1* | 5/2008 | Utaki | F16G 13/16 |
| | | | 59/78.1 |
| 2008/0256921 A1* | 10/2008 | Jaeker | H02G 3/0475 |
| | | | 264/231 |
| 2009/0077942 A1* | 3/2009 | Utaki | H02G 3/0456 |
| | | | 248/51 |
| 2009/0084603 A1* | 4/2009 | Utaki | H02G 3/0456 |
| | | | 174/72 A |
| 2010/0217261 A1* | 8/2010 | Watson | A61M 25/0147 |
| | | | 604/95.04 |
| 2013/0075129 A1* | 3/2013 | Kaihotsu | H02G 11/006 |
| | | | 174/68.3 |
| 2013/0075130 A1* | 3/2013 | Kaihotsu | F16G 13/16 |
| | | | 174/68.3 |
| 2013/0341061 A1* | 12/2013 | Kaihotsu | F16G 13/16 |
| | | | 264/177.17 |
| 2015/0360629 A1* | 12/2015 | Sekino | B60R 16/037 |
| | | | 174/68.3 |
| 2016/0380417 A1* | 12/2016 | Yamamoto | B60R 16/0215 |
| | | | 174/68.3 |
| 2018/0126927 A1* | 5/2018 | Sekino | B60R 16/0215 |
| 2019/0099550 A1* | 4/2019 | Estlin | A61M 5/1418 |
| 2019/0173269 A1* | 6/2019 | Hermey | H02G 3/0608 |
| 2022/0381371 A1 | 12/2022 | Eriksen | |
| 2023/0343484 A1 | 10/2023 | Zimniki | |

FOREIGN PATENT DOCUMENTS

| | | |
|---|---|---|
| EP | 4361696 A1 | 5/2024 |
| GB | 2481690 B | 1/2012 |
| JP | 2006166492 A | 6/2006 |
| JP | 2013032817 A | 2/2013 |
| JP | 2013055737 A | 3/2013 |
| JP | 2013150522 A | 8/2013 |
| JP | 2014200158 A | 10/2014 |
| WO | 9417534 A1 | 8/1994 |
| WO | 2011063828 A1 | 6/2011 |
| WO | 2020027328 A1 | 2/2020 |

OTHER PUBLICATIONS

International Preliminary Report on Patentability dated Nov. 21, 2023 in corresponding International Application No. PCT/US2022/031071, 11 pages.

International Search Report and Written Opinion mailed in PCT/IB2025/000053 on Jun. 30, 2025 (9 pages).

* cited by examiner

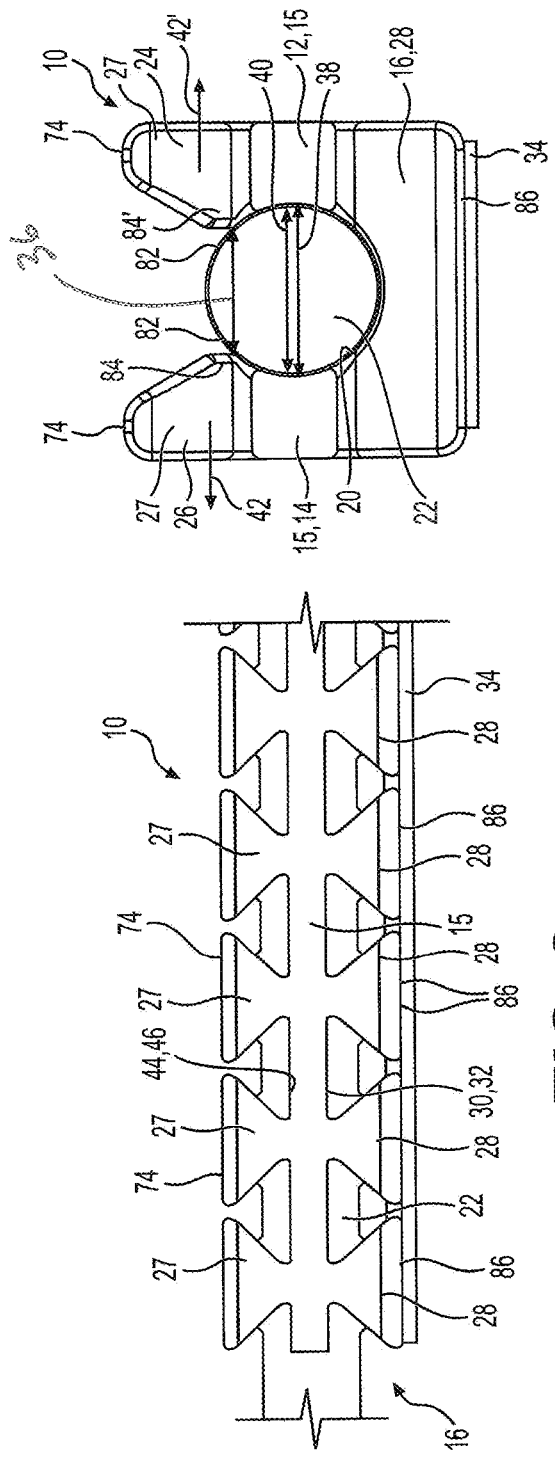
FIG. 2
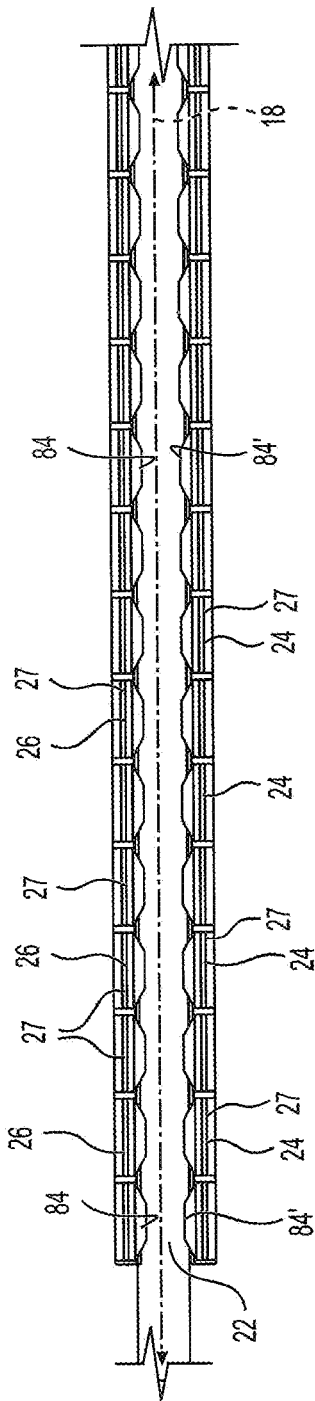
FIG. 3
FIG. 4

FLEXIBLE CABLE SUPPORT

CROSS REFERENCE TO RELATED APPLICATION

This application claims priority to U.S. Provisional Patent Application No. 63/193,274 filed May 26, 2021, the disclosure of which is incorporated herein by reference in its entirety.

TECHNICAL FIELD

The present disclosure generally relates to a support and guide apparatus which facilitates the installation of a communications cable.

BACKGROUND

Improper installation of a communications cable may result in attenuation of a signal being conveyed in the cable, which is commonly known as "signal loss". With respect to optical fiber cables, the signal loss may result from the incomplete transmission of an optical signal through the optical fiber cable. There are different reasons for losses which may occur during the transmission of optical signals through an optical fiber cable.

Also, as electronic components have become smaller and more densely packed, more electrical, optical or other forms of signal transmission cables are attached to the components. Accordingly, the components have become more difficult to organize. In addition, as the cables become more densely packed, they are subject to more stress and great probability of entanglement and damage. This situation is particularly significant for optical fiber cables. Optical fibers, for example, have a minimum bend radius. If the optical fibers are bent beyond the minimum bend radius, the fibers will be damaged. When used in this application, "cable" refers to optical fiber cables and the like.

For example, when an optical fiber cable is bent, the propagation conditions in the optical fiber cable may become altered such that light rays that would propagate in a straight optical fiber are lost in the cladding of the optical fiber. In general, bending loss may be the result of macrobending or microbending. Macrobending is the bending of the cable in a tight radius. Microbending refers to bending a small portion of the cable. Microbending may be caused by pinching or squeezing the cable and can result from mishandling or improper installation of the cable.

Nonetheless, different optical fiber cables have different specifications regarding the degree to which the cable can be bent without affecting performance of the cable or resulting in signal loss. When the bend curvature defines an angle that is too sharp for the optical signal to be reflected back into the core of the particular optical fiber, some of the optical signal may escape through the fiber cladding causing optical signal loss.

Cable performance and the reduction of signal loss may be facilitated through proper cable handing and installation. Thus, a continuing need exists for improved apparatuses and methods which facilitate the installation and support of communications cables.

SUMMARY

A flexible cable support includes a first elongated member, a second elongated member and a base. The first elongated member (or first portion) and the second elongated member (or second portion) extend along a longitudinal axis. The base (or base portion) may connect the first elongated member and second elongated member. The first elongated member, the base, and the second elongated member define a longitudinal recess which is configured to receive a cable. The first elongated member (first portion), second elongated member (second portion) and the base (or base portion) may be integral to one another. The first and second elongated members (or first and second portions) may be flexible members.

The flexible cable support may further include a plurality of first extensions and a plurality of second extensions. The plurality of first extensions may extend from the first elongated member, and the plurality of second extensions may extend from the second elongated member. The plurality of first extensions and the plurality of second extensions may also be formed from a flexible material. The plurality of first extensions may be integral to a first upper side of the first elongated member and the plurality of second extensions may be integral to a second upper side of the second elongated member. A first and a second extensions may be configured to flex in opposing outward lateral directions as a cable is inserted into the longitudinal recess which is disposed between the first and second extensions.

The base of the flexible cable support may be defined by a plurality of lower extensions wherein each lower extension connects the first elongated member and the second elongated member. An adhesive layer may be affixed to the plurality of lower extensions. The plurality of lower extensions may be integral to a first lower surface of the first elongated member and a second lower surface of the second elongated member.

The longitudinal recess may define a first recess width and a second recess width wherein the second recess width is greater than the first recess width. The second recess width is configured to accommodate the diameter of a cable.

Each lower extension, each first extension and each lower extension include a lower region, a distal region and a middle region. The lower region may be integral to at least one of the first elongated member or the second elongated member. The distal region includes a distal end and the middle region is disposed between the distal region and the lower region. The lower region may define a first width. The distal region defines a second width at the distal end. The second width at the distal region of each extension may be greater than the first width of each extension. The middle region defines a varying width which progressively increases along an extension length towards the distal end. The second width of each lower extension, the second width of each first extension, and the second width of each second extension may, but not necessarily be equal in length. Alternatively, the second width of each lower extension, the second width of each first extension, and the second width of each second extension are equal in length while the second width of each lower extension may be greater or less than second width of each first extension and each second extension. The distal end of a first extension is configured to abut an adjacent distal end of an adjacent first extension when the first and second elongated members are bent to a maximum first predetermined angle which may be less than 180 degrees. Similarly, the distal end of a second extension may also be configured to abut an adjacent distal end of an adjacent second extension when the first and second elongated members are bent to the maximum first predetermined angle.

However, when the elongated members are bent to a maximum second predetermined angle which is greater than 180 degrees (a reflex angle), then the distal end of a lower extension is configured to abut an adjacent distal end of an adjacent lower extension when the first and second elongated members are bent to a predetermined angle which may be greater than 180 degrees.

BRIEF DESCRIPTION OF THE DRAWINGS

Further advantages and features of the present disclosure will become apparent from the following description and the accompanying drawings, to which reference is made. In which are shown:

FIG. 2 is a partial, side view of the flexible cable support of FIG. 1A.

FIG. 3 is a cross-sectional view of the flexible cable support and cable along line 3-3 in FIG. 2.

FIG. 4 is a plan view of the flexible cable support and cable in FIG. 1A.

DETAILED DESCRIPTION

Figure 1A:
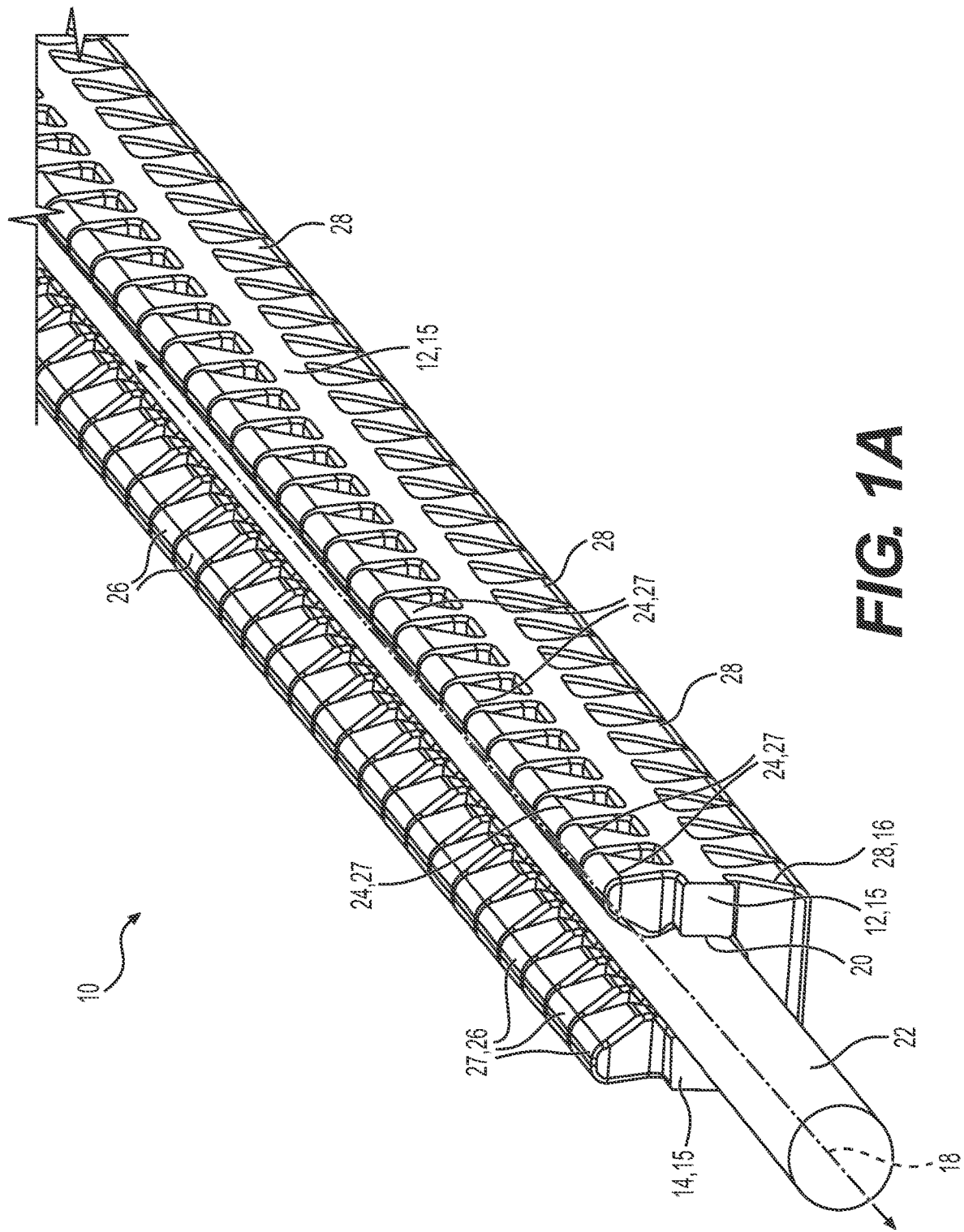
FIG. 1A is an isometric view of a first non-limiting example flexible cable support according to the present disclosure wherein a cable is disposed in the flexible cable support.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, un-recited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

As shown in FIG. 1, an isometric view of a first non-limiting example flexible cable support 10 according to the present disclosure wherein a cable 22 is disposed in the flexible cable support 10. The flexible cable support 10 shown in FIG. 1 may, but not necessarily, be an integrated flexible member formed from a polymeric material. The flexible cable support 10 is configured to support and guide a cable 22 in a variety of ways as shown in the non-limiting examples described herein.

Referring now to FIGS. 1-3, the flexible cable support 10 includes a first elongated member 12 (or first portion 12), a second elongated member 14 (or second portion 14), and a base 16 wherein the first elongated member 12 (first portion 12), second elongated member 14 (second portion 14) and the base 16 define a longitudinal recess 20. The first elongated member 12 (first portion 12) and the second elongated member 14 (second portion 14) may both be elongated flexible members as shown in FIGS. 1-2 wherein the first elongated member 12 and the second elongated member 14 extend along a longitudinal axis 18 as shown in FIG. 1. As shown in FIGS. 5B and 5C, the first elongated member 12 (first portion 12) and the second elongated member 14

(second portion 14) are at least configured to bend according to a reflex angle 68 (FIG. 5B) as later described herein, an acute angle (FIG. 5C) as later described herein and configured to be disposed in a flat orientation or 180 degrees (FIG. 1).

The flexible cable support 10 may also optionally include an adhesive layer 34 as shown in FIG. 6 wherein the adhesive layer 34 may be affixed to the base 16 of the cable support 10. A single adhesive layer 34 may be affixed to the outer surface 86 of the base 16 along the length of the base 16 in a longitudinal direction or the adhesive layer 34 may be intermittently affixed to the outer surface 86 of the base 16 so that only portions of the outer surface 86 of the base 16 have an adhesive layer 34. The adhesive layer 34 is configured to affix the cable support 10 (and associated cable 22) to a structure 80 in a particular fashion as later described herein. Alternative to the optional adhesive layer 34, the flexible cable support 10 may also optionally include a fastener and a tab (not shown) wherein the tab is configured to receive the fastener. The tab may be coupled to (or integral to) the first elongated member 12 (first portion 12) or the second elongated member 14 (second portion 14) or both. The longitudinal recess 20 is configured to receive the cable 22.

As shown in FIG. 3, the base 16 may define the lower region 48 of the longitudinal recess 20. Both the first elongated member 12 (first portion 12) and the second elongated member 14 (second portion 14) define at least the middle region 52 of the longitudinal recess 20. As shown in the plan view provided in FIG. 4, the longitudinal recess 20 is accessible from the top of the flexible cable support 10 to enable insertion of the cable 22 into the longitudinal recess 20. As shown in FIG. 2, the longitudinal recess 20 defines a first recess width 36 and a second recess width 38 wherein the second recess width 38 is greater than the first recess width 36. The second recess width 38 is configured to accommodate the full diameter 40 of a cable 22. The first recess width 36 is less than both the full diameter 40 of the cable 22 and the second recess width 38. However, it is understood that at least the first elongated member 12 (first portion 12) and the second elongated member 14 (second portion 14) are flexible members which are configured to flex in opposing outward lateral directions 42, 42' (see FIG. 3) as the cable 22 is inserted into the longitudinal recess 20. Similarly, it is understood that the plurality of first and second extensions 24, 26 may also be configured to flex in opposing outward lateral directions 42, 42' as the cable 22 is inserted into the longitudinal recess 20. Upon exerting a force onto the cable 22 so as to install the cable 22 into the longitudinal recess 20 of the cable support 10, the first and second elongated members 12, 14 and/or the first and second extensions 24, 26 (which are proximate to the region of cable 22 being inserted) are urged in opposing outward lateral directions 42, 42'. Therefore, upon inserting the cable 22 into the flexible cable support 10, the first recess width 36 (FIG. 3) may temporarily increase due to the flexion of the cable support 10 and to accommodate the full diameter of the cable as described above. Once the cable 22 is fully seated in the longitudinal recess 20 as shown in FIGS. 2-3, the upper side regions 84, 84' of the longitudinal recess 20 abut portions of the upper surface 82 of the cable 22 to maintain the cable 22 in position within the longitudinal recess 20 of the flexible cable support 10.

Referring again to FIG. 1B, a plurality of first extensions 24 may extend from a first upper side 46 of the first elongated member 12 (or first portion 12) and a plurality of second extensions 26 may extend from a second upper side 44 of the second elongated member 14 (or second portion 14). In the example shown in FIGS. 1A-4, the plurality of first extensions 24 may, but not necessarily be integral to a first upper side 44 of the first elongated member 12 (first portion 12). Similarly, the plurality of second extensions 26 may, but not necessarily, be integral to a second upper side 46 of the second elongated member 14 (second portion 14). As shown in FIG. 3, the plurality of first extensions 24 and the plurality of second extensions 26 may be flexible such that they may flex in opposing, outward/lateral directions 42, 42' (see FIG. 3) upon insertion of the cable 22 as previously described.

Figure 1B:
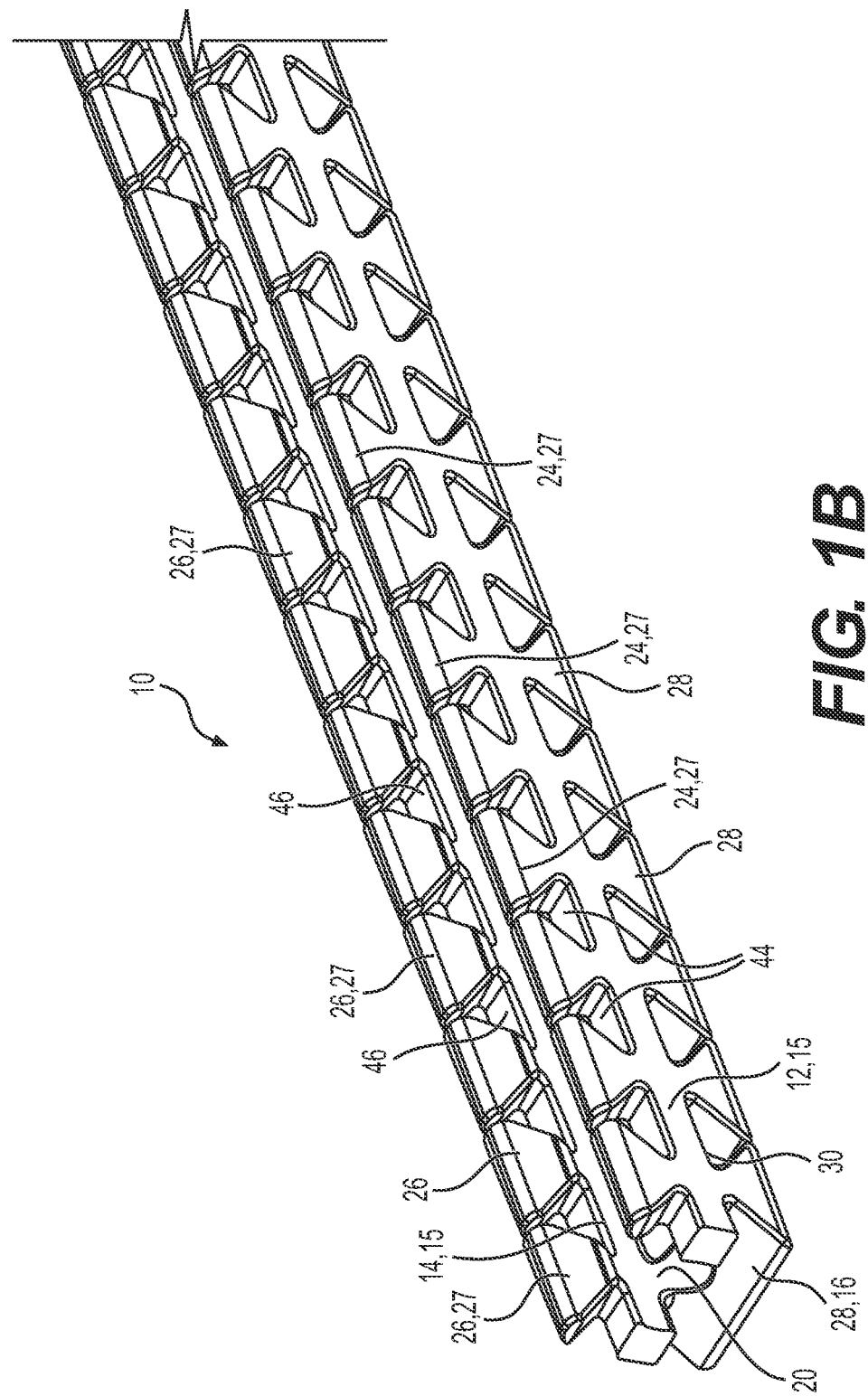
FIG. 1B is an isometric view of the flexible cable support in FIG. 1A which illustrates an example longitudinal recess wherein the cable is removed from the flexible cable support.

Referring to FIGS. 1-3, the base 16 is defined by a plurality of lower extensions 28. As shown in FIGS. 1B and 3, each lower extension connects the first elongated member 12 (first portion 12) to the second elongated member 14 (second portion 14). The plurality of lower extensions 28 may, but not necessarily, be integral to a first lower side of the first elongated member 12 (first portion 12) and a second lower side 32 of the second elongated member 14 (second portion 14). The adhesive layer 34 (shown as element 34 in FIG. 3) may optionally be affixed to the outer surface 86 (FIGS. 2-3) of the plurality of lower extensions 28. It is understood that the first elongated member 12 (first portion 12), second elongated member 14 (second portion 14), and the base 16 may, but not necessarily, be integral to one another. The first elongated member 12 (first portion 12), second elongated member 14 (second portion 14), and base 16 may but not necessarily be formed via an injection molding process, and may even be formed via a dual shot injection molding process in the event the first elongated member 12 (first portion 12), second elongated member 14 (second portion 14), and the base 16 must have different elasticity characteristics (varying modulus of elasticity). However, it is also understood that the first elongated member 12 (first portion 12), second elongated member 14 (second portion 14) and the base 16 may also be separate components.

Figure 5A:
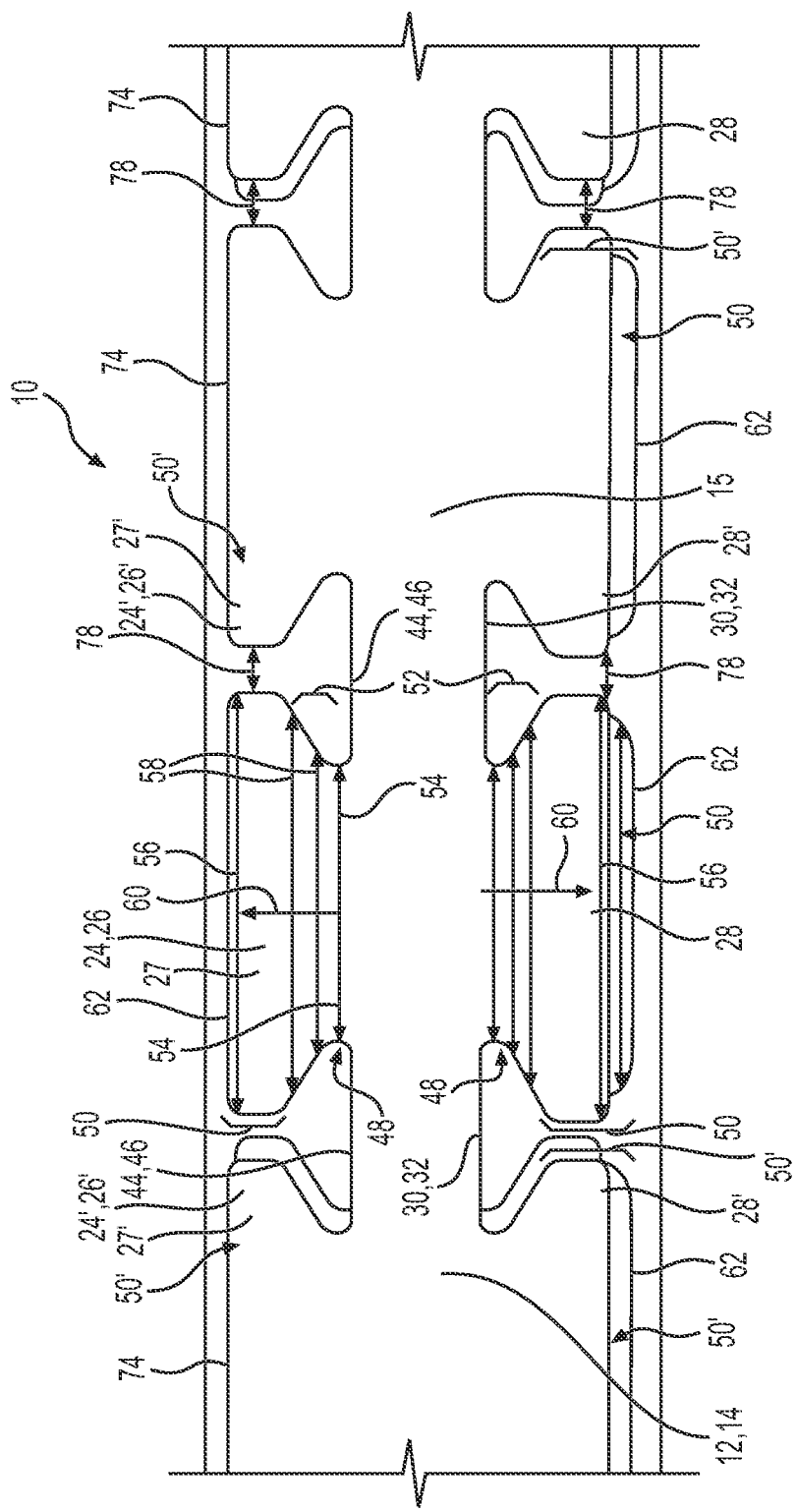
FIG. 5A is a side view of the flexible cable support of FIG. 1A without the cable.
Figure 5C:
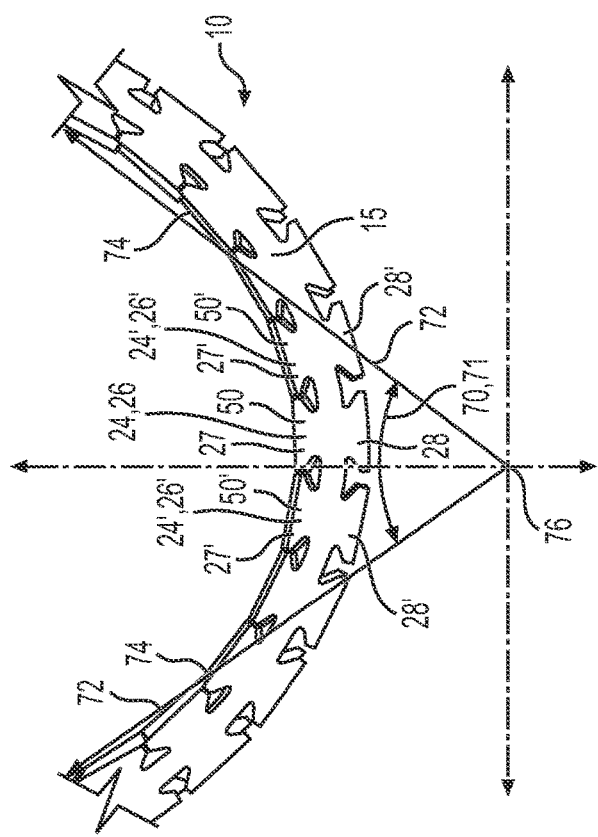
FIG. 5C is a side view of the flexible cable support where flexible cable support is bent to a predetermined angle which is less than 180 degrees.
Figure 5B:
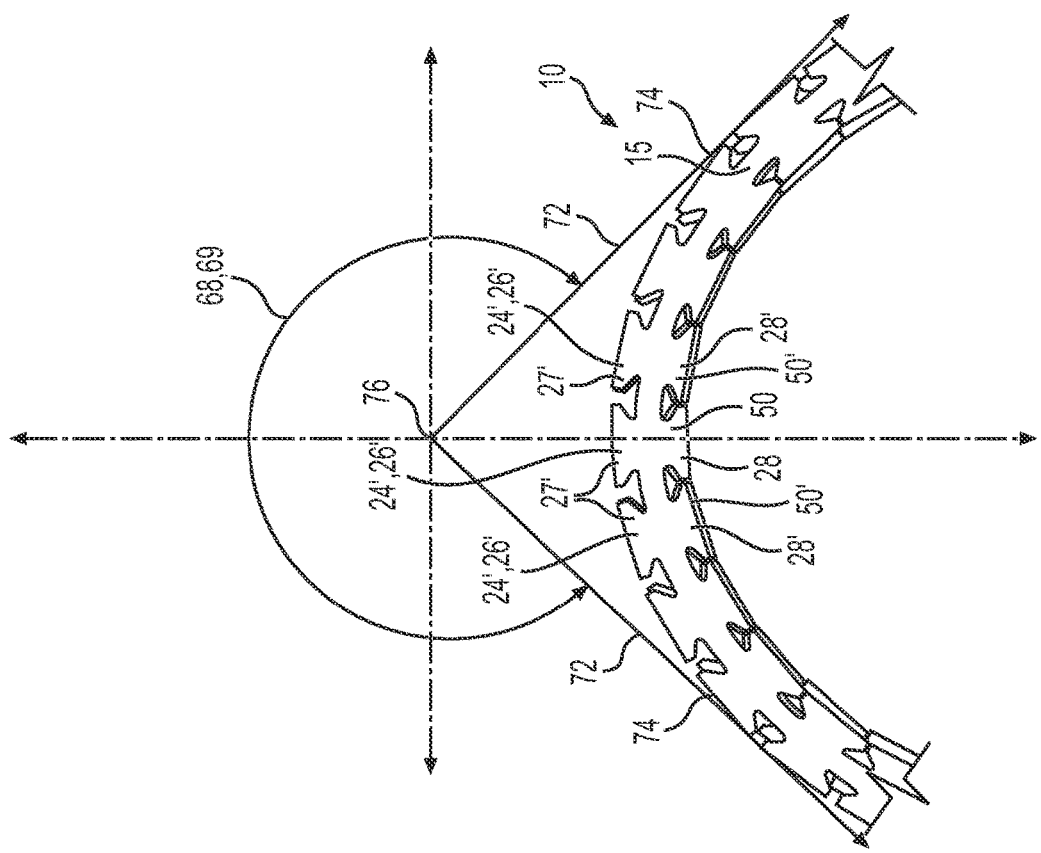
FIG. 5B is a side view of the flexible cable support where flexible cable support is bent to a predetermined angle which exceeds 180 degrees.

As shown in FIG. 5A, an enlarged partial view of an exemplary side of the cable support 10 is shown without the adhesive layer 34. It is understood that in this example embodiment the first extension 24 and the second extension 26 have the same side profile. Therefore, the side views (first side view showing the first elongated member 12 and the second side view showing the second elongated member 14) of the example cable support 10 are the same regardless of whether the first side view is shown or the second side view is shown. Regardless, as shown in the side view in FIG. 2 (which may illustrate either the first side view showing the first elongated member 12 (first portion 12) or the second side view showing second elongated member 14 (second portion 14)), the extension 27 (first extension 24 or second extension 26) includes a lower region 48 which is integral to its corresponding elongated member 15 (first elongated member 12 or second elongated member 14). Therefore, the plurality of first extensions 24 are integral to the first elongated member 12 (first portion 12) while the plurality of second extensions 26 are integral to the second elongated member 14 (second portion 14).

As shown in FIGS. 1A-1B, the plurality of first extensions 24 may span along the length of the first elongated member 12 (first portion 12) and the plurality of second extensions 26 may span along the length of the second elongated member 14 (second portion 14). It is understood that extension 27 as used in the present disclosure is intended to generically reference a first extension 24 and/or a second extension 26. Similarly, it is also understood that elongated member 15 (or portion 15) as used in the present disclosure is intended to generically reference the first elongated member 12 and/or the second elongated member 14.

Referring to FIG. 5A, each extension 27 (first extension 24 or second extension 26) includes a distal region 50 having a distal end 62 as well as a middle region 52 disposed between the distal region 50 and the lower region 48. As shown in FIG. 5A, the lower region 48 of each extension 27 (first extension 24 or second extension) defines a first width 54 which is adjacent to the corresponding elongated member 15 (or portion 15) which may be either the first elongated member 12 or second elongated member 14. The distal region 50 defines a second width 56 at the distal end 62 of the extension 15. The second width 56 is greater than the first width 54. However, as shown in FIG. 5A, the middle region 52 may, but not necessarily define a varying width 58 which progressively increases along the length 60 of the extension ("extension length 60) towards the distal end 62.

With reference to the plurality of lower extensions 28, the plurality of lower extensions 28 connect the first elongated member 12 (first portion 12) to the second elongated member 14 (second portion 14) as previously indicated. (See FIGS. 1A &3). Similarly, the plurality of the lower extensions 28 may span the length of both the first and second elongated members 12, 14. However, as shown in FIGS. 1A-1B and 5A, it is also understood that each lower extension 28 also includes a distal region 50 having a distal end 62 as well as a middle region 52 disposed between the distal region 50 and the lower region 48. As shown in FIG. 5A, the lower region 48 of each lower extension 28 defines a first width 54 which is adjacent to both the first elongated member 12 (first portion 12) and the second elongated member 14 (second portion 14) and the distal region 50 of the lower extension 28 also defines a second width 56 in the distal region 50 of the lower extension 28. The second width 56 is greater than the first width 54. However, as shown in FIG. 5A, the middle region 52 of each lower extension 28 may, but not necessarily define a varying width 58 which progressively increases along the length 60 of the extension ("extension length 60) towards the distal end 62. It is understood that the second width 56 of each first extension 24 may be equal in length to the second width 56 of each second extension 26 to enable uniform flexion of the cable 10 if desired. It is also understood that the second width 56 of each lower extension 28 may, but not necessarily, be equal in length to the second width 56 of each first extension 24 and may, but not necessarily, also be equal in length to the second width 56 of each second extension 26 such that each first extension 24, each second extension 26 and each lower extension 28 have the same second width 56 length.

Referring now to FIGS. 5B-5C, FIG. 5B is a side view of the flexible cable support 10 where flexible cable support 10 is bent to a maximum second predetermined reflex angle 69 which exceeds 180 degrees, and FIG. 5C is a side view of the flexible cable support 10 where flexible cable support 10 is bent to a predetermined non-reflex angle 71 or a maximum first predetermined angle 71 which is less than 180 degrees. With respect to the various examples of the present disclosure, it is understood that the tangent lines 72 of the top surface 74 (from the center of rotation 76) define a flexion angle 66 which may be a reflex angle 68 (greater than 180 degrees) or a non-reflex angle 70 (less than 180 degrees). It is understood that the cable support is not bent (as shown in FIGS. 1A-1B) when the angle 66 between the tangent lines 72 is 180 degrees. In FIG. 5B, the tangent lines 72 of the top surface 74 (from the center of rotation 76) form a reflex angle 68 wherein the flexible cable support 10 is bent all the way to a maximum predetermined reflex angle 69 wherein at least one lower extension 28 abuts the adjacent lower extensions 28'. At this predetermined reflex angle 69, the distal region 50 of a lower extension 28 in the plurality of lower extensions 28 is configured to abut the adjacent distal regions 50' of the adjacent lower extensions 28' when the first and second elongated members 12, 14 are bent to the predetermined reflex angle 69. As shown, it is also understood that the distal region 50 of the lower extension 28 may abut the adjacent distal regions 50' of the adjacent lower extensions 28' disposed on each side of the lower extension 28.

Accordingly, the abutment between the distal regions of the lower extensions 28, 28' as shown during such flexion prevents macrobending of the cable 22 and therefore, prevents unnecessary damage to the cable 22 during the installation process. Noting that certain cables 22 may have certain bending limits, it is understood that the maximum, predetermined reflex angle 69 is set during the design process according to the length of the second width 56 of each lower extension 28. Therefore, as the second width 56 of each lower extension 28 is increased (during the design process), the maximum predetermined reflex angle 69 would be decreased. Accordingly, as the second width 56 of each lower extension 28 increases during the design process, the gap 78 (shown in FIG. 5A) may decreases. Thus, the maximum, predetermined reflex angle 69 would decrease. The gap 78 is evident when the flexible cable support 10 is straight as shown in FIG. 5A. Similarly, as the second width 56 of each lower extension 28 is decreased (during the design process), the predetermined reflex angle 69 would be increased and the gap 78 (evident in FIG. 5A where the cable support 10 is straight) would also increase to enable the increased predetermined reflex angle 69.

Noting that the flexion angle 66 may be any angle, the example of FIG. 5C shows a flexion angle 66 which is less 180 degrees ("non-reflex angle 70"). Therefore, the flexion angle of FIG. 5C is a non-reflex angle 70. The tangent lines 72 of the top surface 74 (from the center of rotation 76) form an acute angle wherein the flexible cable support 10 is bent all the way to a maximum, predetermined non-reflex angle 71. It is understood that the "non-reflex angle 70" may be an acute angle or an obtuse angle.

In FIG. 5C showing a flexion angle 66 which is less than 180 degrees, the tangent lines 72 of the top surface 74 (from the center of rotation 76) form a flexion angle 66 where the flexible cable support 10 is bent all the way to a predetermined non-reflex angle 71. At this predetermined non-reflex angle 71, the distal region 50 of a first extension 24 in the plurality of first extensions 24 is configured to abut the adjacent distal regions 50' of the adjacent first extensions 24' when the first and second elongated members 12, 14 are bent all the way to the maximum predetermined non-reflex angle 71.

In the example provided in FIG. 5C, each first extension 24 and each second extension 26 define a second width 56 having equal lengths. It is understood that the cable support 10 of the present disclosure may, but not necessarily, provide first extensions 24 which are aligned with second extensions 26 (as shown in FIGS. 1, 3, 5A-5C) to enable (optional) uniform flexion of the cable support 10 if desired. Therefore, FIGS. 5A-5C side views are identical regardless of whether the first elongated member 12 (first portion 12) and first extensions 24 are shown or whether the second elongated member 14 (second portion 14) and second extensions 26 are shown. Nonetheless, referring again to FIG. 5C, a distal region 50 of a second extension 26 in the plurality of second extensions 26 is configured to abut the adjacent distal regions 50' of the adjacent second extensions 26' when the first and second elongated members 12, 14 are bent to the predetermined non-reflex angle 71.

Figure 6A:
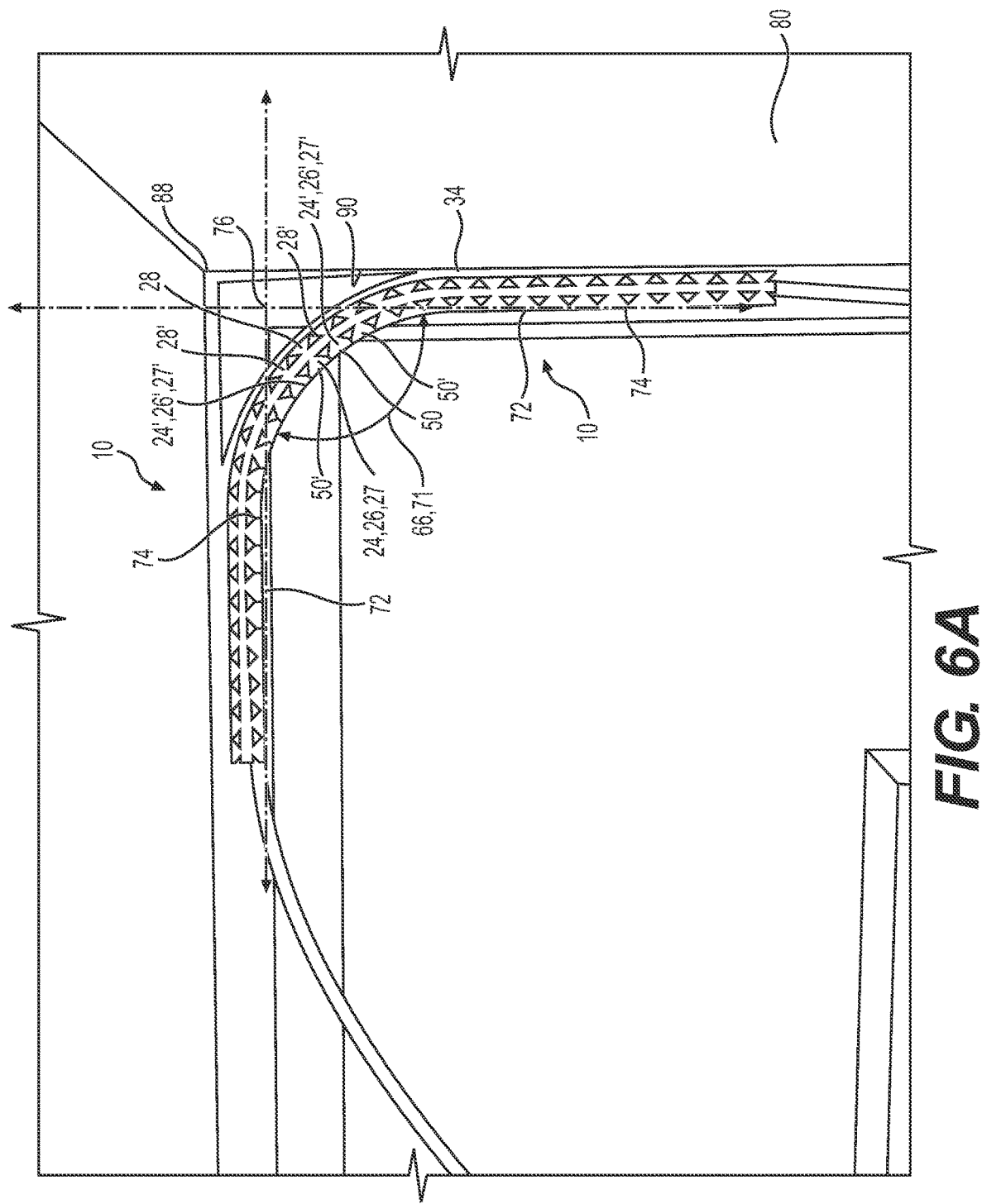
FIG. 6A is a side view of the flexible cable support and cable in FIG. 1A installed on an inner surface of a corner frame wherein the flexible cable support is bent to an angle which is less than 180 degrees.

Referring now to FIG. 6A, a side view of the flexible cable support 10 and cable 22 in FIG. 1 installed onto an inner surface 80 of a corner frame 80 (or structure 80) wherein the flexible cable support 10 is bent to all the way to an example predetermined non-reflex angle 71 which is set at 90 degrees. Therefore, each extension in the plurality of first and second extensions 24, 26 is configured to abut an adjacent distal end 62' of an adjacent extension when the first and second elongated members 12, 14 are bent to the predetermined non-reflex angle 71. In the region proximate to the corner of the frame, the abutment between distal regions 50, 50' of the adjacent extensions 15 (from either the first elongated member 12 (first portion 12) and/or second elongated member 14 (second portion 14)) prevents the possibility of the cable 22 being subjected to macrobending such that the optical fibers could be damaged as the cable 22 is routed proximate to the corner 88 shown. It is understood that only the distal end 62 of each first extension 24 and each second extension 26 may, but not necessarily formed by a rigid material (for example, by a dual shot injection molded process) such that little to no compression could occur as the adjacent distal end 62's abut each other. Alternatively, the distal end 62 of each first extension 24 and each second extension 26 may, but not necessarily formed by flexible material (such as but not limited to the same material implemented in the first elongated member 12 (first portion 12) and second elongated member 14 (second portion 14)) wherein some compression could occur at each distal end 62 as the adjacent distal end 62's abut each other. In the example of FIG. 6A, the adhesive layer 34 attaches the cable support 10 (and the accompanying cable 22) to an inner corner of a frame. However, it is understood that the adhesive layer 34 of the cable support 10 may also attach the cable support 10 (and the accompanying cable 22) to yet another cable support 10 (and its accompanying cable 22) should portions of multiple lines be routed in close proximity to one another.

Figure 6B:
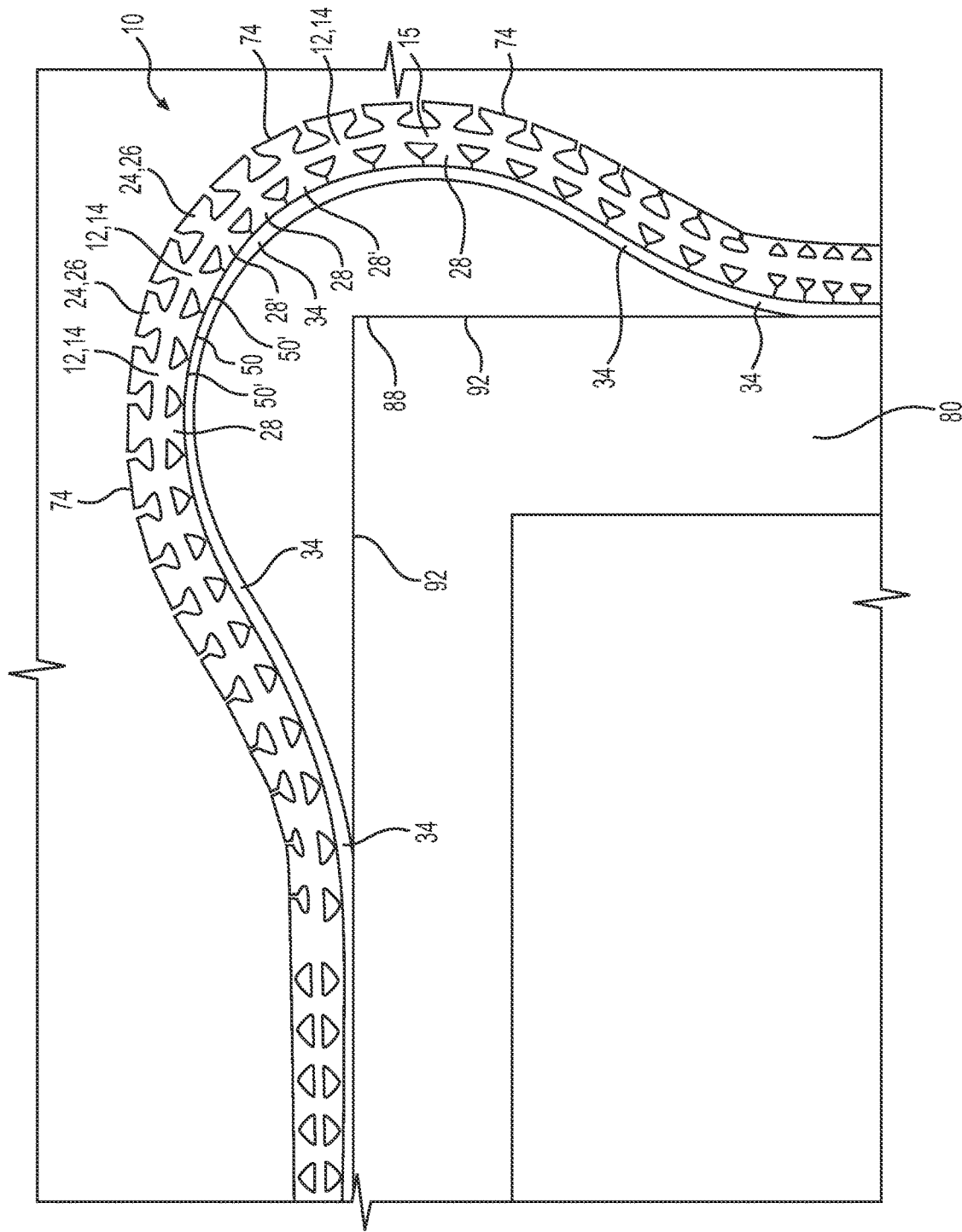
FIG. 6B is a side view of the flexible cable support and cable in FIG. 1A installed on an outer surface of a corner frame wherein the flexible cable support is bent to an angle which is greater than 180 degrees.

Referring now to FIG. 6B, the flexible cable support 10 and cable 22 in FIG. 1A is installed on an outside surface 92 of a corner frame 80 (or structure 80) wherein the flexible cable support 10 is bent to a reflex angle 68 which is greater than 180 degrees. Therefore, a distal region 50 of a lower extension 28 is configured to abut the adjacent distal regions 50' of the adjacent lower extensions 28' when the first and second elongated members 12, 14 are bent all the way to the maximum predetermined reflex angle 69. In the region proximate to the corner 88 of the frame 80, the abutment between the (distal regions 50, 50' of) adjacent lower extensions 28, 28' prevents the possibility of the cable 22 from being subjected to macrobending (to prevent damage to optical fibers) as the cable 22 is routed proximate to the outside corner 88 shown. It is understood that only the distal region 50 of each extension 24, 26, 28 may, but not necessarily formed by a relatively rigid material (for example, by a dual shot injection molded process) such that little to no compression could occur as the adjacent distal end 62's abut each other. Alternatively, the distal region 50 of each first extension 24 and each second extension 26 may, but not necessarily formed by flexible material (such as but not limited to the same material implemented in the first elongated member 12 (first portion 12) and second elongated member 14 (second portion 14)) wherein some compression could occur at each distal end 62 as the adjacent distal end 62's abut each other.

In the example of FIG. 6B, the adhesive layer 34 attaches the cable support 10 (and the accompanying cable 22) to an outer surface 92 of a frame 80. However, as indicated above, it is understood that the adhesive layer 34 of the cable support 10 may also attach the cable support 10 (and the accompanying cable 22) to yet another cable support 10 (and its accompanying cable 22) should portions of multiple lines be routed in close proximity to one another.

While various example, non-limiting embodiments have been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A flexible cable support configured to prevent damage to a cable received therein comprising:
    a first linear elongated member structurally configured to extend continuously in a longitudinal direction from a first end to a second end;
    a plurality of first extension portions that are structurally configured to extend from the first elongated member in a first direction that is perpendicular to the longitudinal direction;
    a second linear elongated member structurally configured to extend continuously in the longitudinal direction from the first end to the second end;
    a plurality of second extension portions that are structurally configured to extend from the second elongated member in the first direction;
    a base portion configured to connect the first elongated member and the second elongated member;
    wherein the first elongated member is spaced apart from the second elongated member in a second direction that is perpendicular to the first direction and the longitudinal direction so as to define a cable receiving portion therebetween that extends from the first end to the second end and is configured to receive a cable;
    wherein the base portion is configured to define a lower region of the cable receiving portion;
    wherein the base portion includes a plurality of base extension portions that are each structurally configured to extend away from the cable receiving portion and to extend from the first elongated member and the second elongated member in a second direction that is opposite to the first direction so as to connect the first elongated member and the second elongated member;
    wherein the first elongated member is spaced apart from the second elongated member in a second direction that is perpendicular to the first direction and the longitudinal direction so as to define a receiving portion therebetween that extends from the first end to the second end and is configured to receive a cable;
    wherein the plurality of first extension portions are spaced apart from the plurality of second extension portions in the second direction such that the plurality of first extension portions and the plurality of second extension portions are structurally configured to define an opening that extends from the first end to the second end so as to permit a cable to be inserted into the receiving portion via the opening in the first direction;

wherein each of the plurality of first extension portions is spaced apart from an adjacent one of the plurality of first extension portions in the longitudinal direction, each of the plurality of second extension portions is spaced apart from an adjacent one of the plurality of second extension portions in the longitudinal direction; and each of the plurality of base extension portions is spaced apart from an adjacent one of the plurality of base extension portions in the longitudinal direction;

wherein each of the first extension portions is structurally configured to be opposite to one of the base extension portions in the first direction, and each of the second extension portions is structurally configured to be opposite to one of the base extension portions in the first direction;

wherein each of the first extension portions includes opposite side walls in the longitudinal direction that are structurally configured to taper from a free end toward the first elongated member;

wherein each of the second extension portions includes opposite side walls in the longitudinal direction that are structurally configured to taper from a free end toward the second elongated member;

wherein each of the base extension portions includes opposite side walls in the longitudinal direction that are structurally configured to taper from a free end toward the first and second elongated members;

wherein the first elongated member, the first extension portions, the second elongated member, the second extension portions, and the base extension portions are configured to bend in a plane that includes the longitudinal direction and the first direction;

wherein the first elongated member, the first extension portions, the second elongated member, the second extension portions, and the base extension portions are configured to bend in the plane in a first bend direction where the first extension portions are bent toward the second extension portions;

wherein the first elongated member, the first extension portions, the second elongated member, the second extension portions, and the base extension portions are configured to bend in the plane in a second bend direction that is opposite to the first direction;

wherein the free ends of adjacent ones of the first extension portions are configured to engage one another and the free ends of adjacent ones of the second extension portions are configured to engage one another to prevent a cable in the receiving portion from being bent beyond a minimum bend radius of the cable so as to prevent damage to the cable; and wherein the free ends of adjacent ones of the base extension portions are configured to engage one another to prevent a cable in the receiving portion from being bent beyond the minimum bend radius of the cable so as to prevent damage to the cable.

2. The flexible cable support of claim 1, wherein the opening has a first width in the second direction, and the receiving portion has a second width in the second direction that is greater than the first width.

3. The flexible cable support of claim 2, wherein the plurality of first extension portions and the plurality of second extension portions are configured to retain a cable in the receiving portion.

4. A flexible cable support configured to prevent damage to a cable received therein comprising:

a first linear elongated member structurally configured to extend continuously in a longitudinal direction from a first end to a second end;

a plurality of first extension portions that are structurally configured to extend from the first elongated member in a first direction that is perpendicular to the longitudinal direction;

a second linear elongated member structurally configured to extend continuously in the longitudinal direction from the first end to the second end;

a plurality of second extension portions that are structurally configured to extend from the second elongated member in the first direction;

a base portion configured to connect the first elongated portion and the second elongated portion;

wherein the first elongated member is spaced apart from the second elongated member in a second direction that is perpendicular to the first direction and the longitudinal direction so as to define a cable receiving portion therebetween that extends from the first end to the second end and is configured to receive a cable;

wherein the base portion is configured to define a lower region of the cable receiving portion;

wherein the base portion includes a plurality of base extension portions that are each structurally configured to extend away from the cable receiving portion and to extend from the first elongated member and the second elongated member in a second direction that is opposite to the first direction so as to connect the first elongated member and the second elongated member;

wherein the first elongated member is spaced apart from the second elongated members in a second direction that is perpendicular to the first direction and the longitudinal direction so as to define a receiving portion therebetween that extends from the first end to the second end and is configured to receive a cable;

wherein the plurality of first extension portions are spaced apart from the plurality of second extension portions in the second direction such that the plurality of first extension portions and the plurality of second extension portions are structurally configured to define an opening that extends from the first end to the second end so as to permit a cable to be inserted into the receiving portion via the opening in the first direction;

wherein each of the first extension portions includes opposite side walls in the longitudinal direction that are structurally configured to taper from a free end toward the first elongated member;

wherein each of the second extension portions includes opposite side walls in the longitudinal direction that are structurally configured to taper from a free end toward the second elongated member;

wherein each of the base extension portions includes opposite side walls in the longitudinal direction that are structurally configured to taper from a free end toward the first and second elongated members;

wherein the first elongated member, the first extension portions, the second elongated member, the second extension portions, and the base extension portions are configured to bend in a plane that includes the longitudinal direction and the first direction;

wherein the free ends of adjacent ones of the first extension portions are configured to engage one another and the free ends of adjacent ones of the second extension portions are configured to engage one another to prevent a cable in the receiving portion from being bent beyond a minimum bend radius of the cable so as to prevent damage to the cable; and wherein the free ends of adjacent ones of the base extension portions are configured to engage one another to prevent a cable in the receiving portion from being bent beyond the minimum bend radius of the cable so as to prevent damage to the cable.

5. The flexible cable support of claim 4, wherein the opening has a first width in the second direction, and the receiving portion has a second width in the second direction that is greater than the first width.

6. The flexible cable support of claim 5, wherein the plurality of first extension portions and the plurality of second extension portions are configured to retain a cable in the receiving portion.

7. The flexible cable support of claim 4, wherein each of the plurality of first extension portions is spaced apart from an adjacent one of the plurality of first extension portions in the longitudinal direction, each of the plurality of second extension portions is spaced apart from an adjacent one of the plurality of second extension portions in the longitudinal direction; and each of the plurality of base extension portions is spaced apart from an adjacent one of the plurality of base extension portions in the longitudinal direction.

8. The flexible cable support of claim 4, wherein each of the first extension portions is structurally configured to be opposite to one of the base extension portions in the first direction, and each of the second extension portions is structurally configured to be opposite to one of the base extension portions in the first direction.

9. The flexible cable support of claim 4, wherein the first elongated member, the first extension portions, the second elongated member, the second extension portions, and the base extension portions are configured to bend in the plane in a first bend direction where the first extension portions are bent toward the second extension portions; and wherein the first elongated member, the first extension portions, the second elongated member, the second extension portions, and the base extension portions are configured to bend in the plane in a second bend direction that is opposite to the first direction.

10. A flexible cable support configured to prevent damage to a cable received therein comprising:
a first elongated portion configured to extend continuously in a longitudinal direction from a first end to a second end and having a plurality of first extension portions;
a second elongated portion configured to extend continuously in the longitudinal direction from the first end to the second end and having a plurality of second extension portions;
a base portion configured to connect the first elongated portion and the second elongated portion;
wherein the first elongated portion is spaced apart from the second elongated portion in a first direction that is transverse to a length of the first and second elongated portions so as to define a cable receiving portion therebetween;
wherein the base portion is configured to define a lower region of the cable receiving portion;

wherein the base portion includes a plurality of base extension portions that extend away from the first and second elongated portions;

wherein the plurality of first extension portions are spaced apart from the plurality of second extension portions in the second direction so as to define an opening that is configured to permit a cable to be inserted into the receiving portion via the opening in a second direction that is transverse to the length of the first and second elongated portions;

wherein each first extension of the plurality of first extension portions, and each second extension of the plurality of second extension portions comprises a lower region integral to at least one of the first elongated portion or the second elongated portion, a distal region that includes a distal end, and a middle region disposed between the distal region and the lower region;

wherein the lower region defines a first width and the distal region defines a second width at the distal end, and wherein the second width is greater than the first width;

wherein at least one extension portion of the plurality of first extension portions and at least one extension portion of the plurality of second extension portions are configured to abut an adjacent extension portion when the first and second elongated portions are bent to a first predetermined angle to prevent excessive bending of a cable disposed in the receiving portion so as to prevent damage to the cable; and wherein at least one base extension portion of the plurality of base extension portions is configured to abut an adjacent base extension portion when the first and second elongated portions are bent to a second predetermined angle to prevent excessive bending of a cable disposed in the receiving portion so as to prevent damage to the cable.

11. The flexible cable support of claim 10, wherein the opening has a first width in the first direction, and the receiving portion has a second width in the first direction that is greater than the first width.

12. The flexible cable support of claim 11, wherein the plurality of first extension portions and the plurality of second extension portions are configured to retain a cable in the receiving portion.

13. The flexible cable support of claim 10, wherein each of the plurality of first extension portions is spaced apart from an adjacent one of the plurality of first extension portions in a longitudinal direction, each of the plurality of second extension portions is spaced apart from an adjacent one of the plurality of second extension portions in the longitudinal direction; and each of the plurality of base extension portions is spaced apart from an adjacent one of the plurality of base extension portions in the longitudinal direction.

14. The flexible cable support of claim 10, wherein each of the first extension portions is structurally configured to be opposite to one of the base extension portions in the first direction, and each of the second extension portions is structurally configured to be opposite to one of the base extension portions in the first direction.

15. The flexible cable support of claim 10, wherein the first elongated portion, the first extension portions, the second elongated portion, the second extension portions, and the base extension portions are configured to bend in the plane in a first bend direction where the first extension portions are bent toward the second extension portions; and wherein the first elongated portion, the first extension portions, the second elongated portion, the second extension portions, and the base extension portions are configured to bend in the plane in a second bend direction that is opposite to the first direction.

16. The flexible cable support of claim 10, wherein the first elongated portion and the second elongated portion comprise flexible elongated portions.

17. The flexible cable support of claim 10, wherein the plurality of first extension portions and the plurality of second extensions comprise flexible extension portions.

18. The flexible cable support of claim 10, wherein the first elongated portion, second elongated portion, and the base portion comprise a monolithic structure of unitary construction.

19. The flexible cable support of claim 10, wherein the plurality of first extension portions and the first elongated member comprise a monolithic structure of unitary construction, and the plurality of second extension portions and the second elongated member comprise a monolithic structure of unitary construction.

20. The flexible cable support of claim 10, wherein the plurality of first and second extension portions are structurally configured to flex in an opposing outward lateral direction as a cable is inserted into the receiving portion.

21. The flexible cable support of claim 10, wherein the middle region is configured to have a varying width that progressively increases along an extension length towards the distal end.

22. The flexible cable support of claim 10, wherein the distal end of each first extension portion in the plurality of first extension portions is configured to abut an adjacent distal end of an adjacent first extension portion when the first and second elongated portions are bent to a maximum first predetermined angle.

23. The flexible cable support of claim 22, wherein the distal end of each second extension portion in the plurality of second extension portions is configured to abut an adjacent distal end of an adjacent second extension portion when the first and second elongated portions are bent to the maximum first predetermined angle.

24. The flexible cable support of claim 10, wherein the distal end of each lower base extension portion in the plurality of lower-base extension portions is configured to abut an adjacent distal end of an adjacent lower-base extension portion when the first and second elongated portions are bent to a maximum second predetermined angle.

* * * * *